(12) United States Patent
Nakano et al.

(10) Patent No.: US 12,030,129 B2
(45) Date of Patent: Jul. 9, 2024

(54) WORKING MACHINE

(71) Applicant: Koki Holdings Co., Ltd., Tokyo (JP)

(72) Inventors: Ryosuke Nakano, Ibaraki (JP);
Yoshikazu Yokoyama, Ibaraki (JP);
Ken Inui, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 411 days.

(21) Appl. No.: 17/417,748

(22) PCT Filed: Nov. 29, 2019

(86) PCT No.: PCT/JP2019/046791
§ 371 (c)(1),
(2) Date: Jun. 23, 2021

(87) PCT Pub. No.: WO2020/137358
PCT Pub. Date: Jul. 2, 2020

(65) Prior Publication Data
US 2022/0072638 A1 Mar. 10, 2022

(30) Foreign Application Priority Data

Dec. 28, 2018 (JP) .................................. 2018-248284

(51) Int. Cl.
*B23D 59/04* (2006.01)
*B23D 49/16* (2006.01)
(Continued)

(52) U.S. Cl.
CPC ........... *B23D 59/04* (2013.01); *B23D 49/162* (2013.01); *B23D 51/10* (2013.01);
(Continued)

(58) Field of Classification Search
CPC ...... B23D 49/16; B23D 49/162; B23D 51/10; B23D 51/20; B23D 59/04; F16H 57/0408;
(Continued)

(56) References Cited

U.S. PATENT DOCUMENTS

| | | | |
|---|---|---|---|
| 3,971,132 A | * | 7/1976 | Griffies ................ B23D 49/165 30/393 |
| 4,962,588 A | * | 10/1990 | Fushiya ............... B23D 49/002 30/372 |

(Continued)

FOREIGN PATENT DOCUMENTS

| | | |
|---|---|---|
| CN | 101096086 | 1/2008 |
| CN | 101602125 | 12/2009 |

(Continued)

OTHER PUBLICATIONS

"Office Action of China Counterpart Application", dated Jun. 27, 2023, with English translation thereof, pp. 1-16.
"International Search Report (Form PCT/ISA/210) of PCT/JP2019/046791," dated Feb. 18, 2020, with English translation thereof, pp. 1-4.
(Continued)

*Primary Examiner* — Nhat Chieu Q Do
(74) *Attorney, Agent, or Firm* — JCIPRNET

(57) ABSTRACT

A power tool includes a prime mover, an output shaft that extends along a first direction and retains a tip tool and is driven by the prime mover, a support member that supports the output shaft to be drivable, a gear that rotates around an axis extending in a second direction crossing the first direction and transmits a power of the prime mover to the output shaft, and a gear cover that accommodates the gear and the support member. Inside the gear cover, a lubricant retention portion capable of retaining a lubricant is arranged at a side of the support member, and the lubricant retention portion is partitioned from a gear accommodation portion that accommodates a gear by a wall extending in a direction (Continued)

intersecting an extending direction of the output shaft in the gear cover.

16 Claims, 12 Drawing Sheets

(51) Int. Cl.
*B23D 51/10* (2006.01)
*F16H 57/04* (2010.01)

(52) U.S. Cl.
CPC ..... *F16H 57/0408* (2013.01); *F16H 57/0423* (2013.01); *F16H 57/0434* (2013.01); *F16H 57/0464* (2013.01)

(58) Field of Classification Search
CPC ............. F16H 57/0464; F16H 57/0423; F16H 57/0434
USPC .................................................... 30/392, 166
See application file for complete search history.

(56) References Cited

U.S. PATENT DOCUMENTS

| | | | |
|---|---|---|---|
| 5,450,925 A | * | 9/1995 | Smith ................ B23D 49/165 184/5 |
| 2020/0094432 A1 | | 3/2020 | Monzen et al. |

FOREIGN PATENT DOCUMENTS

| | | | |
|---|---|---|---|
| CN | 103286379 | | 9/2013 |
| CN | 103296831 | | 9/2013 |
| CN | 204035683 | | 12/2014 |
| CN | 204035683 U | * | 12/2014 |
| CN | 107614939 | | 1/2018 |
| CN | 110709202 | | 1/2020 |
| JP | H0544414 | | 6/1993 |
| WO | 2018221105 | | 12/2018 |

OTHER PUBLICATIONS

"Search Report of Europe Counterpart Application", dated Jan. 19, 2022, p. 1-p. 13.

* cited by examiner

WORKING MACHINE

CROSS-REFERENCE TO RELATED APPLICATION

This application is a 371 application of the International PCT application serial no. PCT/JP2019/046791, filed on Nov. 29, 2019, which claims the priority benefits of Japan Patent Application No. 2018-248284, filed on Dec. 28, 2018. The entirety of each of the above-mentioned patent applications is hereby incorporated by reference herein and made a part of this specification.

BACKGROUND

Technical Field

The present invention relates to a working machine that uses a lubricant (grease).

Related Art

Patent literature 1 described below discloses a reciprocating saw (working machine) including a lubrication device. In this lubrication device, a grease chamber (grease reservoir) is arranged above a drive part including an output shaft (plunger) to which the rotation of a motor 2 is transmitted and a transmission mechanism portion, and heat generated between a plunger and a plunger holder that supports the plunger is suppressed by grease supplied from the grease chamber. In a working machine that performs cutting work as described in Patent literature 1, by directing the edge of a cutting tool (blade) downward and moving a main body from top to bottom, a material is cut off with the help of gravity.

LITERATURE OF RELATED ART

Patent Literature

Patent literature 1: Japanese Utility Model Laid-Open No. 5-44414

SUMMARY

Problems to be Solved

In the working machine of Patent literature 1, because the grease chamber is arranged above the plunger, there is a possibility that the above of a housing part that accommodates the transmission mechanism portion may be enlarged. In addition, grease falling from above and contributed to the suppression of frictional heat generated by the plunger directly will fall to the bottom of a region in which a bevel gear is accommodated. The grease that has fallen to the bottom contributes to the lubrication of the bevel gear, but it will be difficult for the grease to function as a lubricant for the plunger again. Therefore, if the cutting work is continued, there is a possibility that the grease will fall below the plunger, and the lubrication performance for the plunger may be reduced. In addition, when a large amount of grease is filled in the grease chamber in order to secure a sufficient supply period of grease, there is a possibility that weight balance and cost effectiveness may deteriorate.

The present invention has been made in recognition of this situation, and an object of the present invention is to provide a working machine that has an excellent lubrication configuration.

Means to Solve Problems

One aspect of the present invention is a working machine. This working machine includes: a prime mover; an output shaft that retains a tip tool and is driven by the prime mover; a support member that supports the output shaft to be drivable; a transmission mechanism that transmits power of the prime mover to the output shaft; and a transmission mechanism accommodation portion that accommodates the transmission mechanism and the support member. Inside the transmission mechanism accommodation portion, a lubricant retention portion capable of retaining a lubricant is arranged at the side of the support member. The transmission mechanism accommodation portion is partitioned into a gear accommodation portion that accommodates a gear and the lubricant retention portion by a wall extending in a direction intersecting an extending direction of the output shaft.

The transmission mechanism accommodation portion may be equipped with a sending mechanism that moves the lubricant in a direction from the gear toward the output shaft side when the prime mover is driven.

The transmission mechanism may have an oscillation mechanism that oscillates at least a part of the transmission mechanism, and the sending mechanism may include a contact portion that is arranged in the at least a part that is oscillated and is capable of contacting the lubricant retained by the grease retention portion.

The contact portion may be an anchor member for locating the support member that supports the output shaft retaining the tip tool.

The filling portion may be arranged under the support member, and a side wall of the filling portion may extend close to the support member.

The filling portion may be arranged in a resin molded body separate from the transmission mechanism accommodation portion.

The transmission mechanism accommodation portion may have a wall surrounding the outer periphery of the gear constituting the transmission mechanism, and the resin molded body may have a wall connected to the wall of the transmission mechanism accommodation portion.

Another aspect of the present invention is a working machine. This working machine including: a prime mover; an output shaft that retains a tip tool; a transmission mechanism that transmits power of the prime mover to the output shaft; and a transmission mechanism accommodation portion that accommodates the transmission mechanism. The transmission mechanism has a conversion mechanism that reciprocates the output shaft back and forth. The transmission mechanism accommodation portion is equipped with a filling portion in which the lubricant is retained, and a sending mechanism that moves the lubricant retained in the filling portion upward when the prime mover is driven.

The sending mechanism may include an inclined portion that is connected to the filling portion, inclined with respect to a direction of the reciprocating motion, and close to the output shaft.

The transmission mechanism may have a reciprocating mechanism that reciprocates at least a part of the transmission mechanism up and down, and the sending mechanism may include a contact portion that is arranged in a reciprocating portion and is capable of contacting the lubricant retained in the filling portion.

Moreover, any combination of the above constituent elements and a conversion of the expression of the present invention between methods, systems and the like are also effective as aspects of the present invention.

Effect

According to the present invention, a working machine capable of suppressing the reduction in lubrication performance can be provided.

BRIEF DESCRIPTION OF THE DRAWINGS

FIG. 9 is a plan view of the front grease receiving member 30a.

FIG. 10 is a side view of the front grease receiving member 30a.

FIG. 12 is a plan view of a rear grease receiving member 40a.

FIG. 13 is a side view of the rear grease receiving member 40a.

DESCRIPTION OF THE EMBODIMENTS

Figure 1:
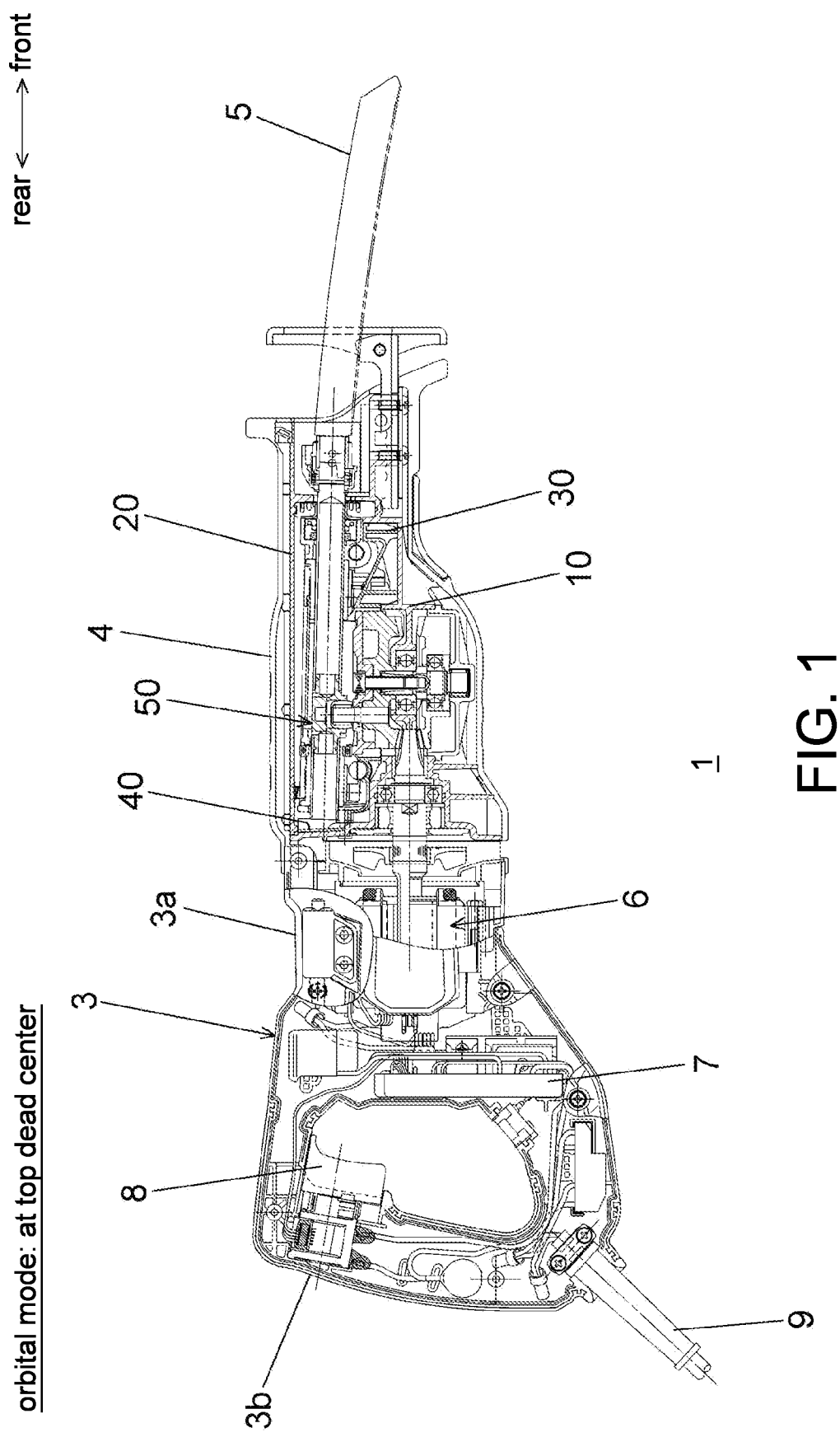
FIG. 1 is a side cross-sectional view of a working machine 1 according to an embodiment of the present invention at an oscillation top dead center position.
Figure 2:
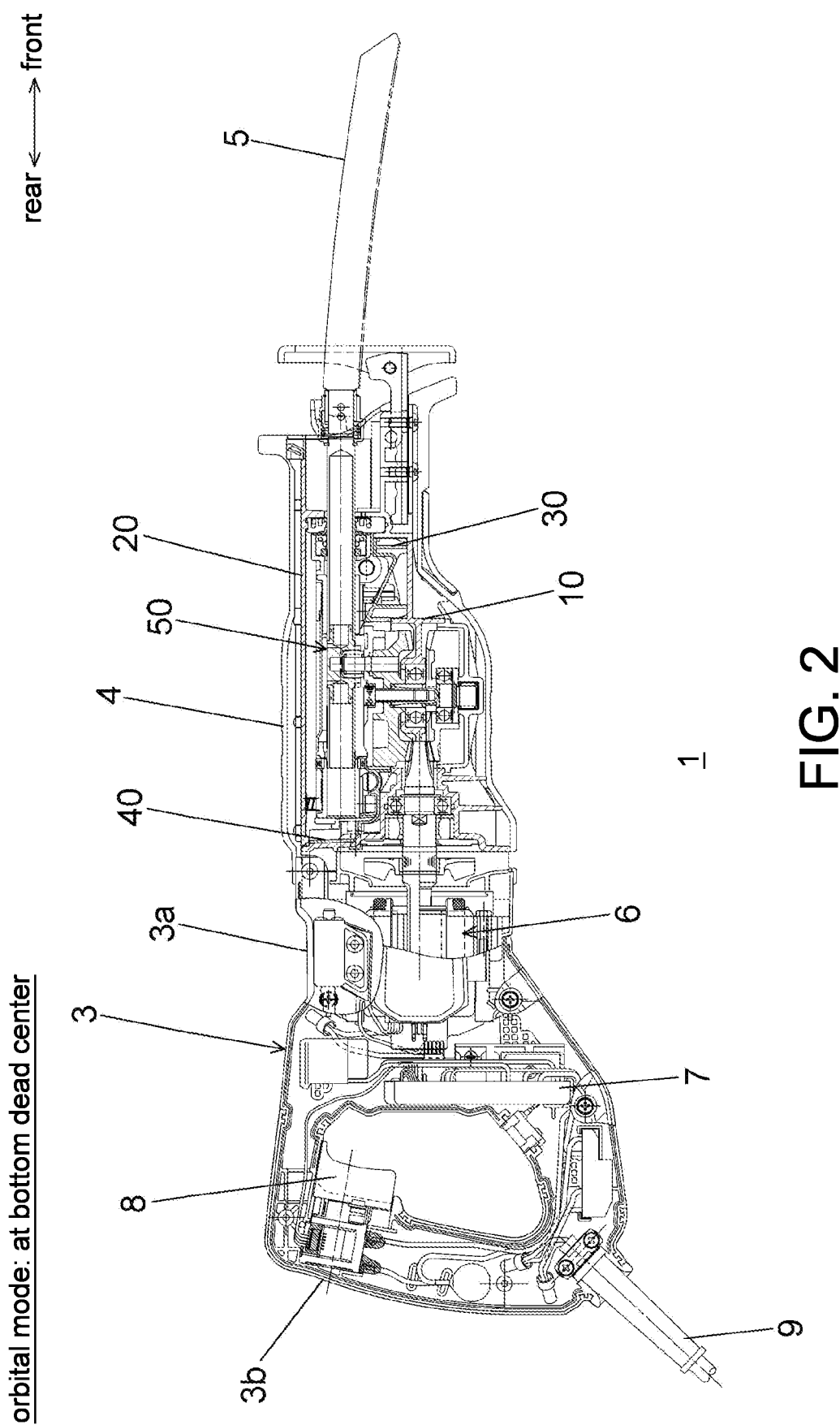
FIG. 2 is a side cross-sectional view of the working machine 1 at an oscillation bottom dead center position.

Hereinafter, a preferred embodiment of the present invention is described in detail with reference to the drawings. Moreover, the same or equivalent constituent elements, members, and the like shown in each drawing are designated by the same reference signs, and redundant description is omitted as appropriate. In addition, the embodiment does not limit the invention but is illustrative, and all the features described in the embodiment and combinations thereof are not necessarily essential to the invention.

A working machine 1 of the embodiment is a saber saw (reciprocating saw). Front-rear, up-down, and left-right directions in the working machine 1 are defined by FIGS. 1 to 5. The working machine 1 includes, for example, a housing 3 composed of a resin molded body and a front cover 4. The front cover 4 is connected and anchored to the front end of the housing 3. The housing 3 has a motor accommodation portion 3a that accommodates a motor 6 and a handle portion 3b that can be gripped by a worker. A control board 7 is arranged behind the motor 6 in the motor accommodation portion 3a. On the upper part of the handle portion 3b, a trigger switch 8 for the operator to operate to instruct drive or stop of the motor 6 is arranged. A power cord 9 for connecting to an external AC power supply extends from the lower end of the handle portion 3b. The working machine 1 operates by electric power supplied via the power cord 9.

The motor 6 serving as a prime mover is retained in the motor accommodation portion 3a of the housing 3 in a manner that a rotating shaft is parallel to the front-rear direction. Power of the motor 6 is transmitted to a saw blade 5 serving as a tip tool by the transmission mechanism 50. As described later, the transmission mechanism 50 has a conversion mechanism that converts the rotation of the motor 6 into a reciprocating motion in the front-rear direction and transmits the rotation to the saw blade 5, and an oscillation mechanism that oscillates the saw blade 5 in the up-down direction by using the rotation of the motor 6. The transmission mechanism 50 is accommodated and retained in an internal space (hereinafter, also referred to as a "gear accommodation space") which serves as a transmission mechanism accommodation portion and is formed by a lower gear cover 10 and an upper gear cover 20. The lower gear cover 10 and the upper gear cover 20 are made of a metal such as aluminum or the like, combined with each other, and fixedly integrated by screwing or the like. Outer surfaces of the lower gear cover 10 and the upper gear cover 20 are entirely covered with the front cover 4. A front grease receiving member 30a and a rear grease receiving member 40a, which are described later, are arranged in the gear accommodation space.

Figure 3:
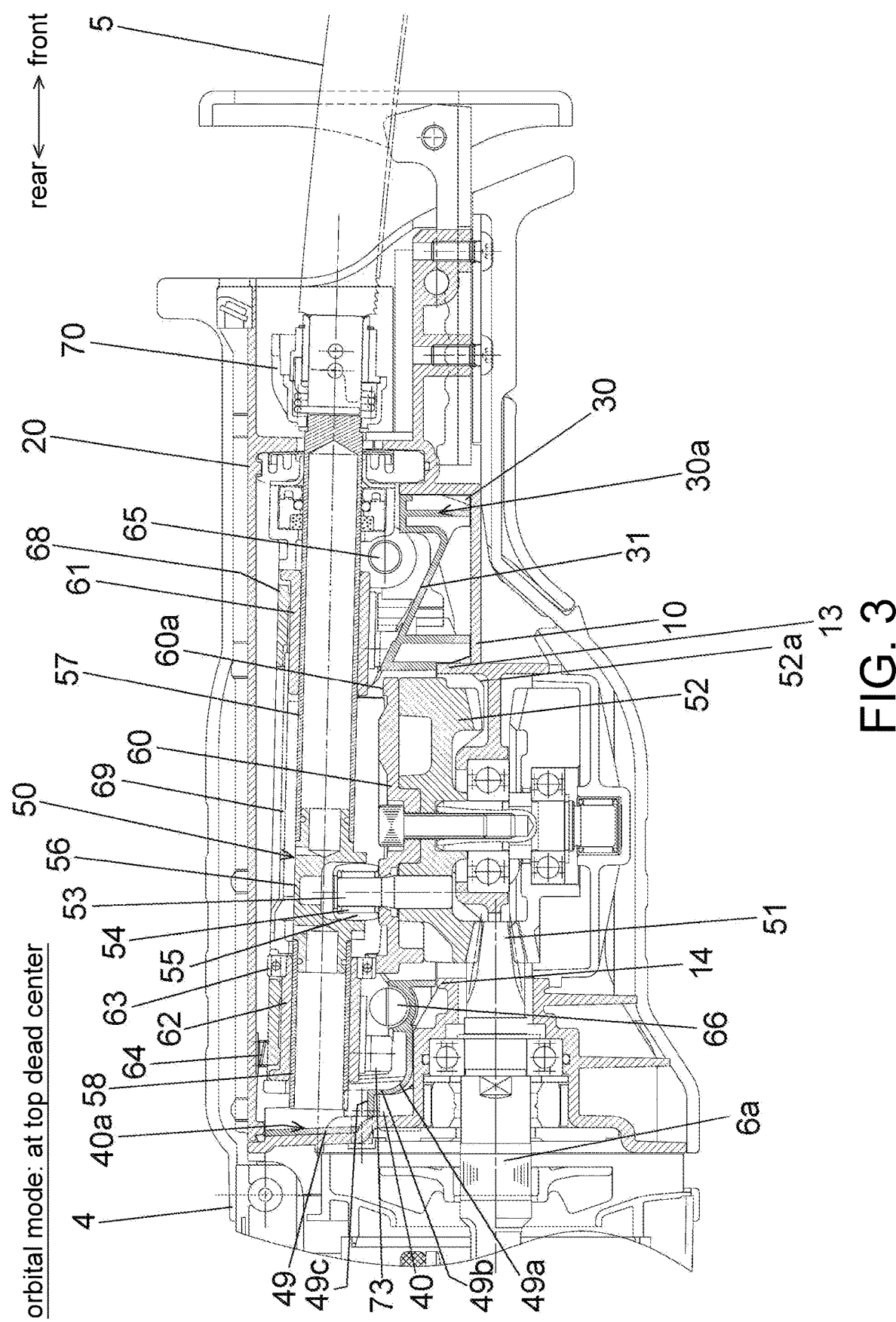
FIG. 3 is an enlarged view of a main part in FIG. 1.
Figure 4:
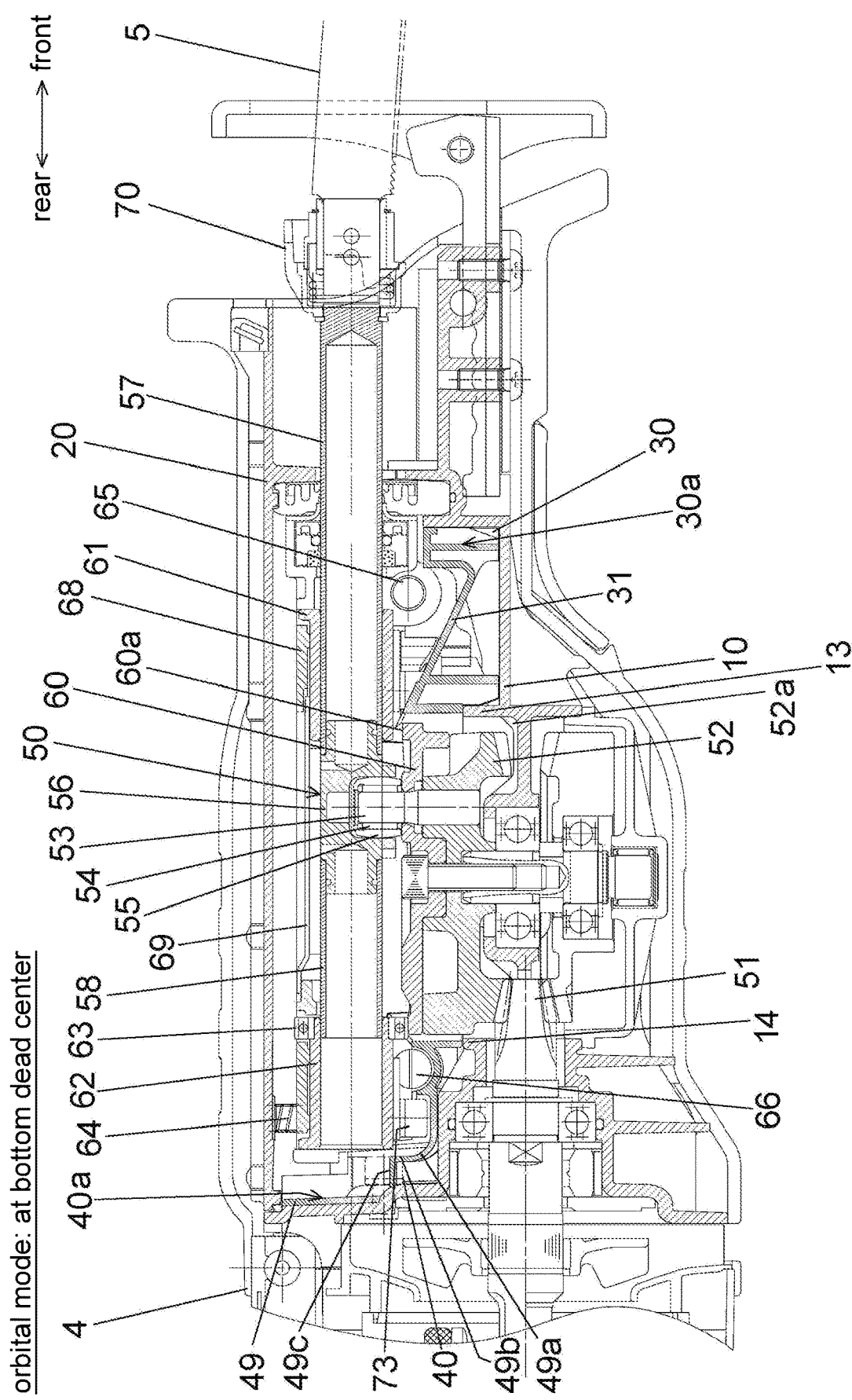
FIG. 4 is an enlarged view of a main part in FIG. 2.

As shown in FIGS. 3 and 4, in the transmission mechanism 50, a first bevel gear 51 rotates integrally with a rotating shaft 6a of the motor 6. A second bevel gear 52 meshes with the first bevel gear 51. A rotating shaft of the second bevel gear 52 is parallel to the up-down direction. The outer periphery of the second bevel gear 52 is surrounded by a front inner wall 13 and a rear inner wall 14 of the lower gear cover 10 shown in FIG. 5. An orbital guide 60 is anchored to the upper surface of the second bevel gear 52 and rotates integrally with the second bevel gear 52. The orbital guide 60 has an inclined surface 60a that circles around a central axis of the orbital guide 60 in the vicinity of the outer circumferential edge. In a state of FIG. 3, the inclined surface 60a is inclined in a manner that the rear part is higher and the front part is lower. In a state of FIG. 4, the inclination of the inclined surface 60a is opposite to that in the state of FIG. 3.

A pin 53 is arranged on the second bevel gear 52 at a position separated from the rotating shaft of the second bevel gear 52, and pivots around the rotating shaft of the second bevel gear 52 as the second bevel gear 52 rotates. The pin 53 protrudes upward from the second bevel gear 52 and penetrates the orbital guide 60. A needle bearing 54 engages with the outer circumferential surface of the upper end of the pin 53. A connecting piece 55 is a roller that engages with the pin 53 via the needle bearing 54 and is rotatable with respect to the pin 53.

Figure 6:
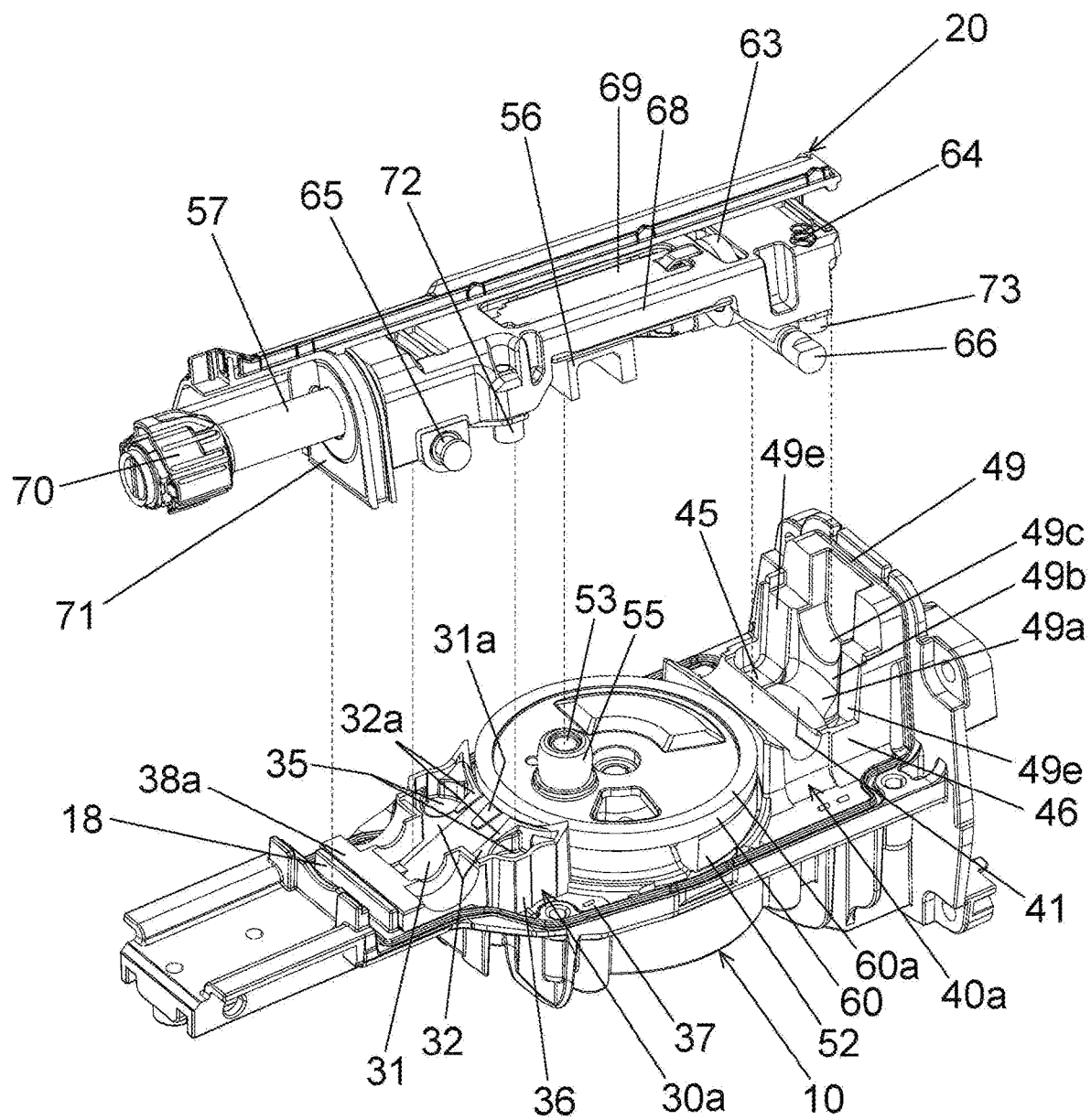
FIG. 6 is a perspective view of the lower gear cover 10 and an upper gear cover in the working machine 1, and internal configurations thereof which are vertically disassembled.

A connector 56 engages with the connecting piece 55 and reciprocates in the front-rear direction as the second bevel gear 52 rotates. A front plunger 57 serving as an output shaft extends forward from the connector 56 and operates integrally with the connector 56. A rear plunger 58 serving as an output shaft extends rearward from the connector 56 and operates integrally with the connector 56. As also shown in FIG. 6, a plunger holder 68 supports the front plunger 57 and the rear plunger 58 to be slidable. A front metal bearing 61 serving as a support member is anchored to the plunger holder 68 by two front metal anchor bolts 72 (FIGS. 6 to 8) serving as anchor members, and is interposed between the front plunger 57 and the plunger holder 68. A rear metal bearing 62 serving as a support member is anchored to the plunger holder 68 by two rear metal anchor bolts 73 (described in FIGS. 6 to 8 and the like) serving as anchor members, and is interposed between the rear plunger 58 and the plunger holder 68. The plunger holder 68 is a support portion of the output shaft in the present invention. A plate 69 is anchored to the plunger holder 68 and extends in the front-rear direction above the connector 56. A blade holder portion 70 is anchored to the front end of the front plunger 57. The blade holder portion 70 retains the saw blade 5. The saw blade 5 extends forward from the blade holder portion 70. A dust seal 71 is arranged on the front surface of the plunger holder 68, and prevents chips and the like from entering the plunger holder 68.

An oscillation axis shaft 65 connects the upper gear cover 20 and the plunger holder 68 in front of the orbital guide 60. The plunger holder 68 can oscillates in the up-down direction with respect to the upper gear cover 20 by the support of the oscillation axis shaft 65. A ball bearing 63 is interposed between the inclined surface 60*a* of the orbital guide 60 and the outer circumferential surface of the plunger holder 68. An outer circumferential portion of the ball bearing 63 comes into contact with the inclined surface 60*a*. An inner circumferential portion of the ball bearing 63 comes into contact with the outer circumferential surface of the plunger holder 68. A spring 64 is arranged between the upper gear cover 20 and the plunger holder 68 behind the ball bearing 63, and urges the plunger holder 68 in a direction (downward) separated from the upper gear cover 20. By the urging of the spring 64, the ball bearing 63 is pressed against the inclined surface 60*a* of the orbital guide 60. When the orbital guide 60 rotates, the ball bearing 63 and the plunger holder 68 oscillate in the up-down direction due to a change in the height of the inclined surface 60*a*. At this time, the oscillation axis shaft 65 serves as a fulcrum for the oscillation of the plunger holder 68.

A change shaft 66 is a shaft for switching to enable or disable an orbital mode of cutting (sharp cutting) while the saw blade 5 is oscillated in the up-down direction by the vertical oscillation of the plunger holder 68. The change shaft 66 is rotatably supported by the upper gear cover 20 behind the orbital guide 60, and extends across the lower side of the plunger holder 68 in the left-right direction. The outer circumferential surface of the change shaft 66 is cut out and the cross section has a semicircular shape. The orbital mode is enabled when the arcuate outer circumferential surface of the change shaft 66 faces downward (the state of FIG. 6). When the change shaft 66 is rotated 180 degrees from the above state and the arcuate outer circumferential surface faces upward, the plunger holder 68 is pushed up to this outer circumferential surface, the ball bearing 63 is separated from the inclined surface 60*a* of the orbital guide 60, and the orbital mode becomes disabled.

The front metal bearing 61 and the rear metal bearing 62 are sliding guide members that respectively guide the sliding of the front plunger 57 and the rear plunger 58 in the front-rear direction, and correspond to the support members of the present invention. In order to facilitate the sliding, grease (lubricant) is required in a space (hereinafter also referred to as a "sliding portion") between the inner circumferential surface of the front metal bearing 61 and the outer circumferential surface of the front plunger 57 that engages with this inner circumferential surface, and a space (hereinafter also referred to as a "sliding portion") between the inner circumferential surface of the rear metal bearing 62 and the outer circumferential surface of the rear plunger 58 that engages with this inner circumferential surface. If the grease of the sliding portions decreases as the work continues, the lubrication performance deteriorates, which may hinder the reciprocating motions of the front plunger 57 and the rear plunger 58 in the front-rear direction. In the embodiment, the decrease of the grease in the sliding portions is suppressed by respectively arranging the front grease receiving member 30*a* in a front grease retention portion 30 and arranging the rear grease receiving member 40*a* in a rear grease retention portion 40.

As shown in FIG. 5, FIG. 6, FIG. 9 through FIG. 14, the front grease receiving member 30*a* and the rear grease receiving member 40*a* have a container shape, and both are preferably resin molded bodies. Here, the container shape is a shape that has an opening and has a bottom with no hole and a side wall in order that a fluid such as a liquid or the like can be retained. Moreover, the container shape may have a hole at the bottom which has a size to prevent a viscous lubricant from flowing down, but in the embodiment, there is no hole at the bottoms of the front grease retention portion 30 and the rear grease retention portion 40. The front grease receiving member 30*a* is a member which is attached to the front grease retention portion 30 located in front of the second bevel gear in the gear accommodation portion, and which is used for sending grease falling into the member to the rear end of the front metal bearing 61 and to a part of the outer circumferential surface of the front plunger 57 that is located behind the rear end of the front metal bearing 61. The rear grease receiving member 40*a* is a member which is attached to the rear grease retention portion 40 located behind the second bevel gear in the gear accommodation portion, and which is used for sending the grease falling into the member to the rear end of the rear metal bearing 62 and to a part of the outer circumferential surface of the rear plunger 58 that is located behind the rear end of the rear metal bearing 62. Hereinafter, a sending mechanism is described which is capable of moving the grease in a direction opposite to an action direction of gravity (an opening direction of the grease receiving member having the container shape), and is capable of moving the grease from the transmission mechanism to the output shafts (the plungers 57 and 58).

As shown in FIG. 5, FIG. 6, FIG. 9 through FIG. 11, in the front grease receiving member 30*a*, a first inclined portion 31 constituting a part of the sending mechanism is arranged at the same position as the front plunger 57 in the left-right direction. The first inclined portion 31 is an inclined surface that becomes higher from the front toward the rear, and a height is constant in the left-right direction. The first inclined portion 31 corresponds to the guide portion in the present invention. A front wall 38 (FIG. 11) is erected at a front end of the first inclined portion 31. From an upper end of the front wall 38, a plane portion 38*a* perpendicular to the up-down direction extends forward. In addition, a lower surface of the plunger holder 68 and the plane portion 38*a* are configured close to each other or in contact with each other. A convex portion 31*a* is arranged at the center of a rear end of the first inclined portion 31. Second inclined portions 32 are respectively arranged on left and right sides of the first inclined portion 31. The second inclined portion 32 is an inclined surface that becomes higher from the front to the rear and has a lower side where the first inclined portion 31 is located. A convex portion 32a is arranged at a rear end of the second inclined portion 32, that is, the end on the first inclined portion 31 side. A grease reservoir concave portion 35 is concaved from the rear end of the second inclined portion 32. Because the front grease receiving member 30a has a container shape that opens upward, the grease that has fallen and moved from above is reserved in the grease reservoir concave portion 35. In addition, walls are also erected on the left and right sides of the first inclined portion 31, and the grease that has fallen and moved from above is also reserved in the first inclined portion 31. That is, the grease reservoir concave portion 35 and the first inclined portion 31 function as the bottom of a container that retains the grease.

Figure 7:
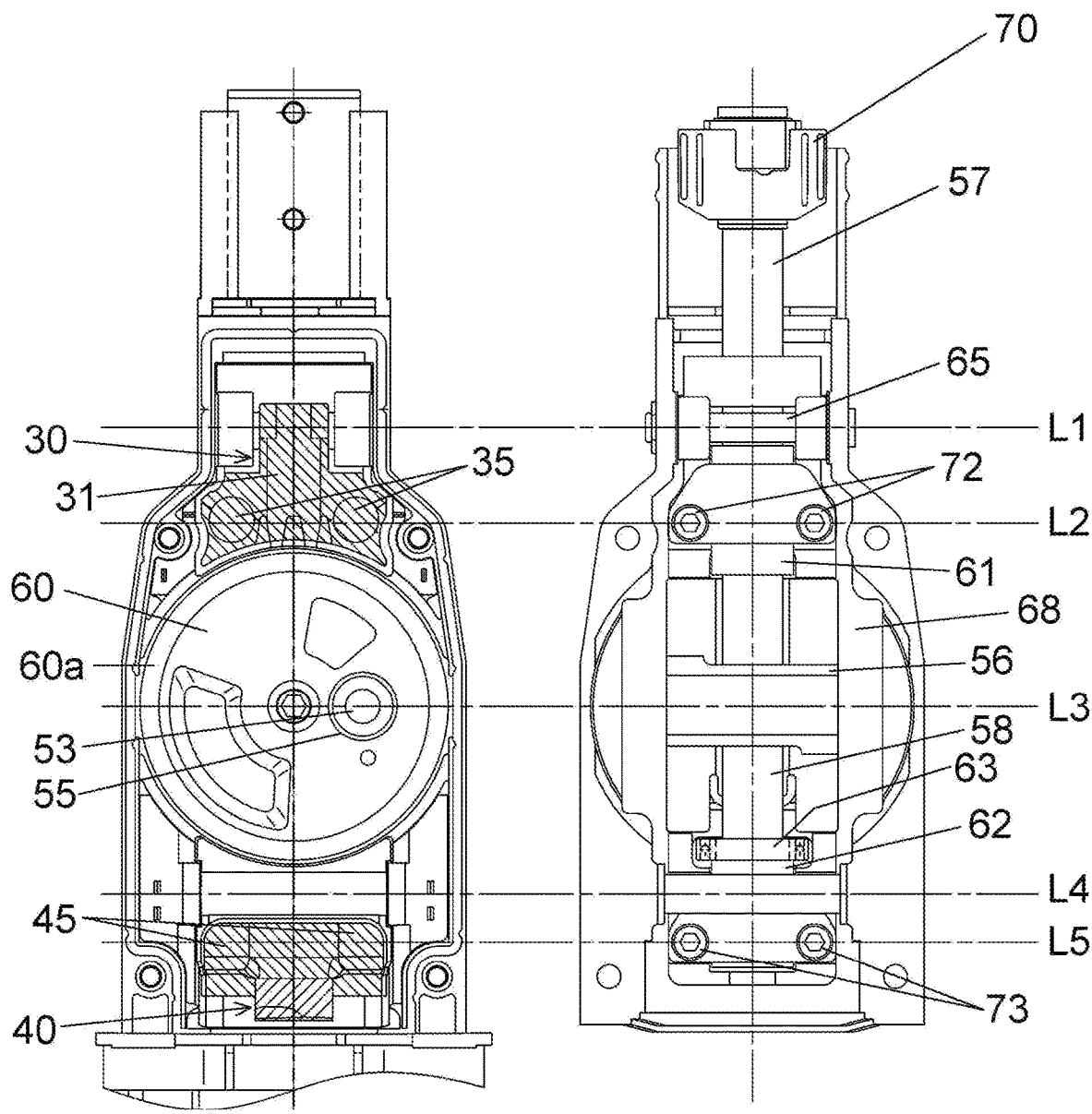
FIG. 7 is a development view showing the lower gear cover 10 and the upper gear cover 20 at a reciprocating center position of the working machine 1, and the internal configurations thereof.
Figure 8:
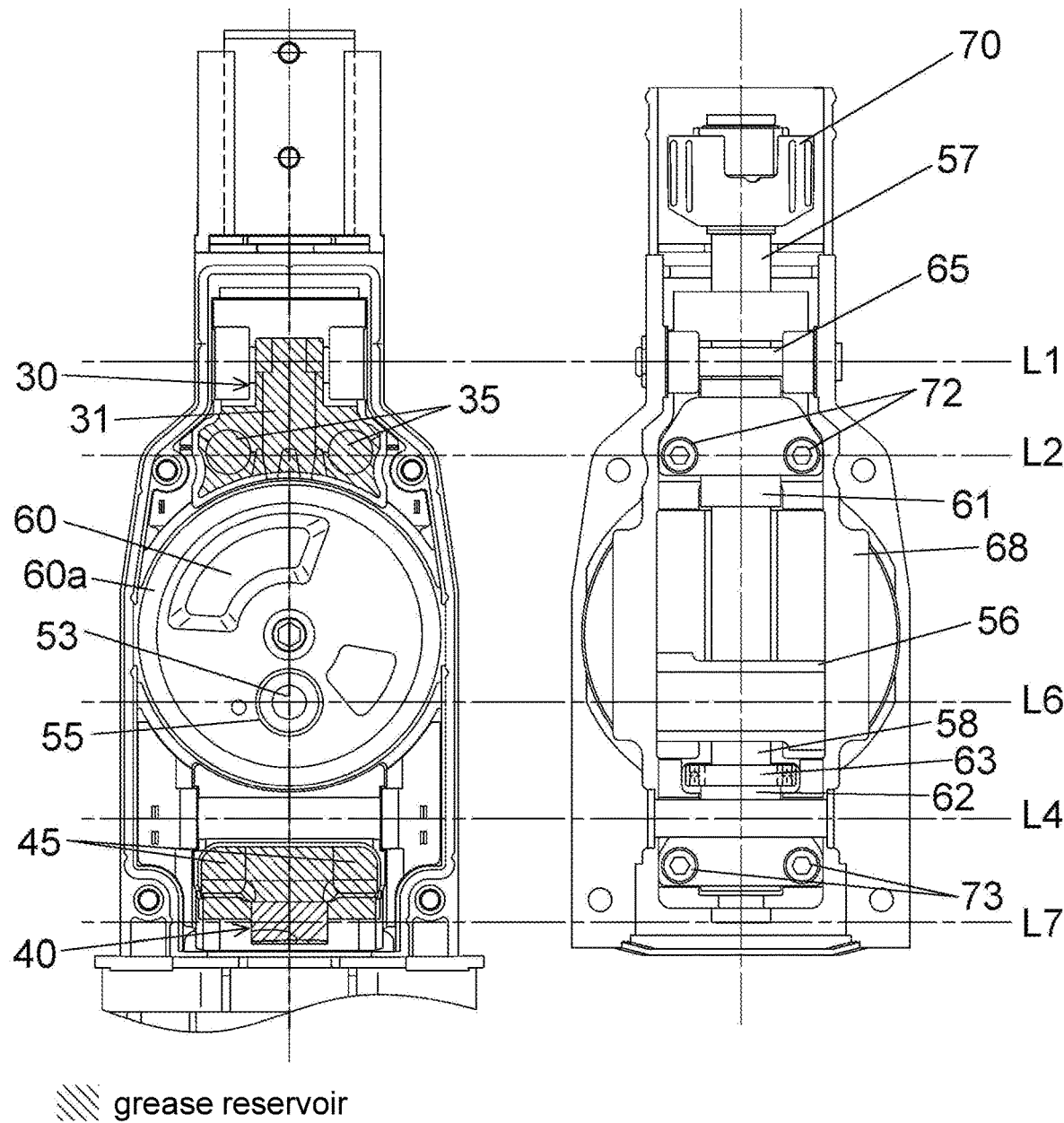
FIG. 8 is a development view showing the lower gear cover 10 and the upper gear cover 20 at a reciprocating final position of the working machine 1, and the internal configurations thereof.
Figure 9:
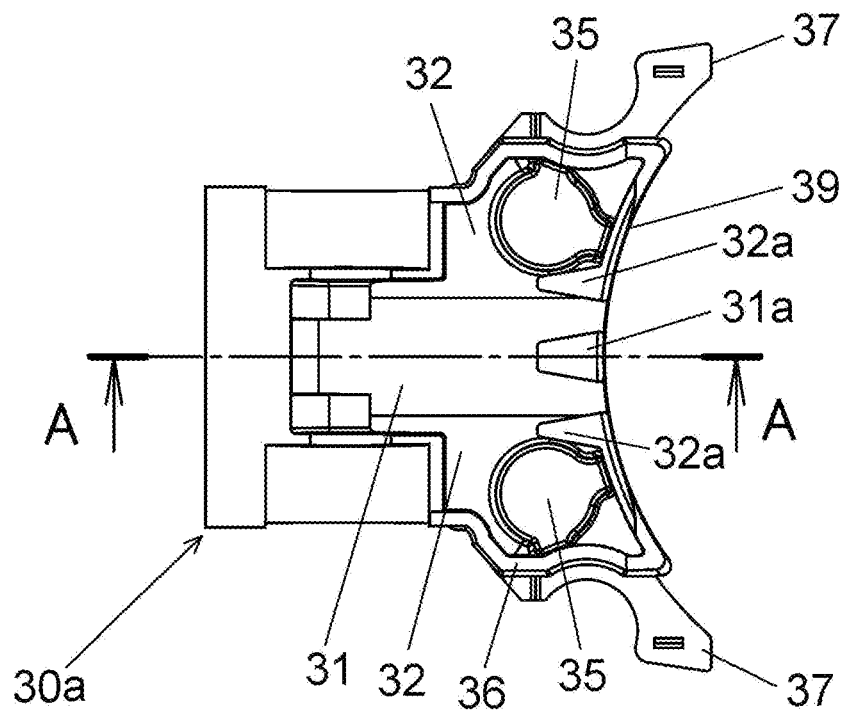
Figure 10:
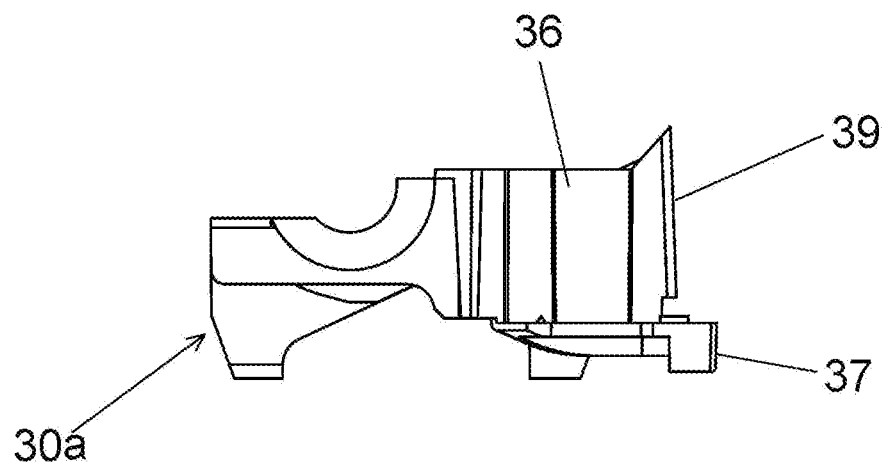
Figure 11:
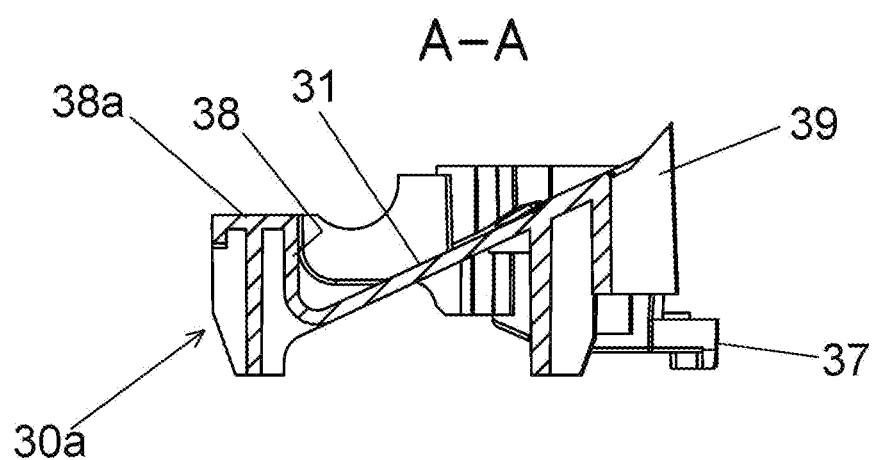
FIG. 11 is a cross-sectional view taken along a line A-A in FIG. 9.
Figure 12:
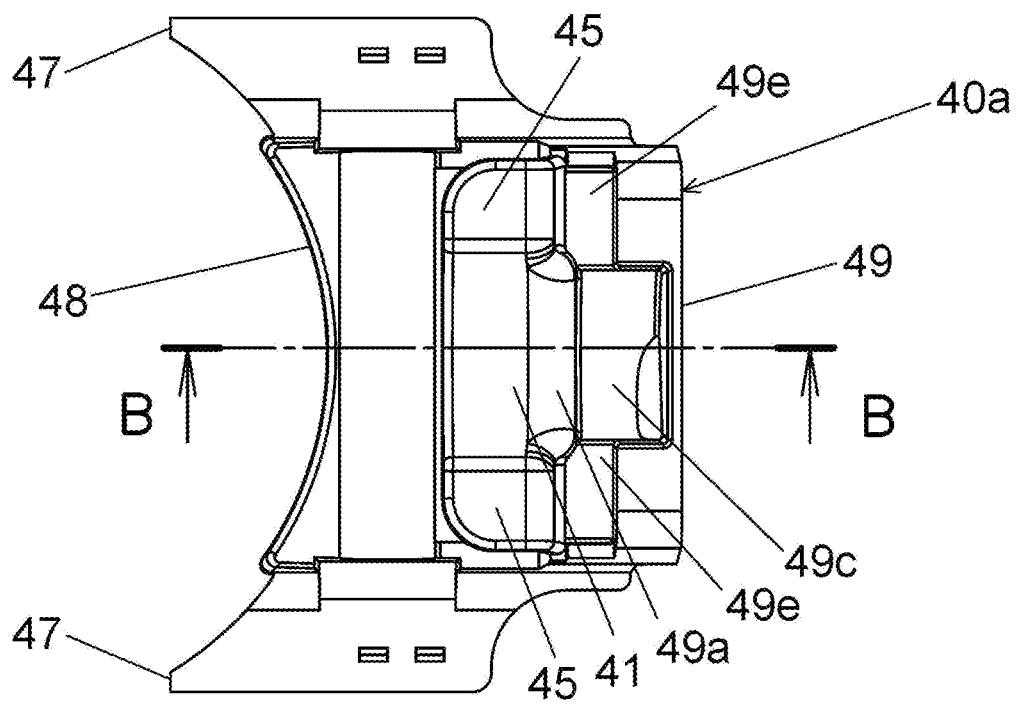
Figure 13:
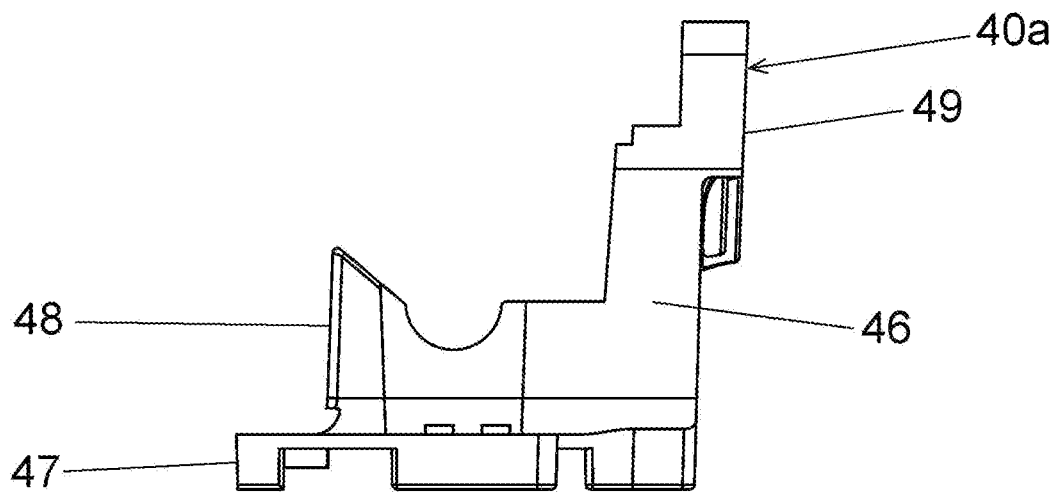
Figure 14:
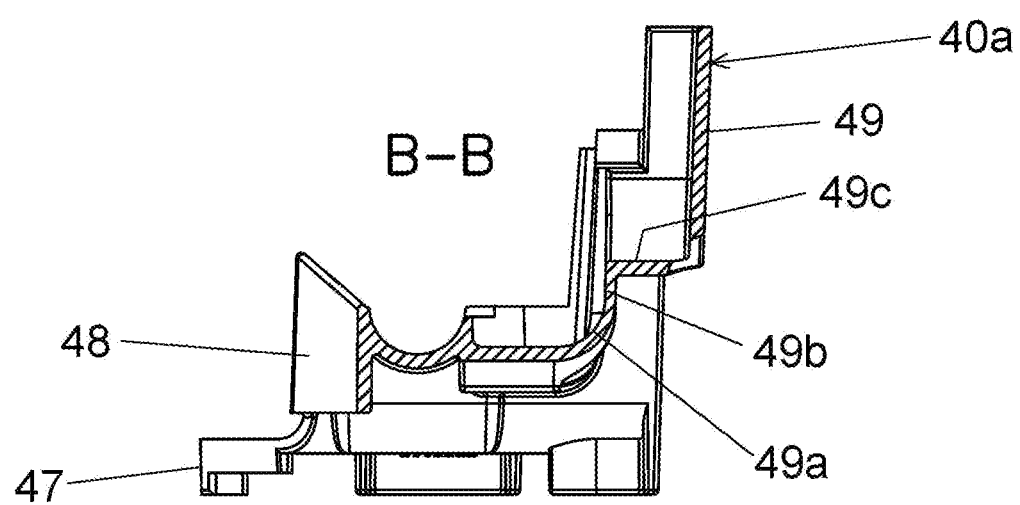
FIG. 14 is a cross-sectional view taken along a line B-B in FIG. 12.

As shown in FIGS. 7 and 8, the grease reservoir concave portion 35 is located at the same position as the front metal anchor bolt 72 in the front-rear direction and the left-right direction. Along with the vertical oscillation (reciprocating motion) of the plunger holder 68, the head of the front metal anchor bolt 72 serving as a contact portion moves in and out of the grease reservoir concave portion 35 from above and comes into contact with the grease in the grease reservoir concave portion 35. Thereby, the grease in the grease reservoir concave portion 35 is pushed out onto the second inclined portion 32. In this way, the front metal anchor bolt 72 constitutes a part of the sending mechanism. Because the second inclined portion 32 is inclined to become lower toward the first inclined portion 31 side, the grease on the second inclined portion 32 moves onto the first inclined portion 31 due to vibration during work, a posture change of the main body, or the like. The grease on the first inclined portion 31 increases the inclination of the first inclined portion 31 due to the vibration during work or the like, and reaches the upper surface of the orbital guide 60. At this time, because the movement path of the grease is narrowed due to the presence of the convex portions 31a and 32a, the grease swells in a height direction due to viscosity of the grease. Thereby, the grease can be moved further upward, for example, it becomes easy to send the grease to the upper surface of the orbital guide 60. Because the front plunger 57 reciprocates in the front-rear direction close to the upper surface of the orbital guide 60, the grease that has moved to the orbital guide 60 adheres to the outer circumferential surface of the front plunger 57, and enters between the outer circumferential surface of the front plunger 57 and the inner circumferential surface of the front metal bearing 61. The grease on the inclined surface 60a of the orbital guide 60 also contributes to the rotation lubrication of the ball bearing 63. The first inclined portion 31 and the second inclined portion 32 function as guide portions for moving the grease upward.

A rear wall 39 hangs downward from the front ends of the first inclined portion 31 and the second inclined portion 32. The rear wall 39 becomes higher from the center in the left-right direction to the left and right. Thereby, the grease is easy to concentrate at the center position in the left-right direction (the existing range of the front plunger 57 in the left-right direction). Leg portions 37 respectively extending left and right forward from a side wall 36 are arranged in contact with the front inner wall 13 and a side wall 16 of the lower gear cover 10 to determine a rear end position of the front grease receiving member 30a and a position of the front grease receiving member 30a in the left-right direction. A front end position of the front grease receiving member 30a is determined by the front end of the plane portion 38a coming into contact with a front wall 18 of the lower gear cover 10. A position of the front grease receiving member 30a in the up-down direction is determined by being clamped between the lower gear cover 10 and the upper gear cover 20. A lower end of the rear wall 39 comes into close contact with an upper end of the front inner wall 13 of the lower gear cover 10. The rear wall 39 corresponds to the resin wall in the present invention. In addition, the front inner wall 13 corresponds to the inner wall in the present invention. The gear accommodation space is partitioned into a gear accommodation portion 52a that accommodates the second bevel gear 52 and the front grease retention portion 30 by a wall that is formed by the rear wall 39 and the front inner wall 13 and extends in a direction intersecting the extending direction (front-rear direction) of the output shafts (plungers 57 and 58). The wall formed by the rear wall 39 and the front inner wall 13 can suppress the movement of the grease from the front grease retention portion 30 to the gear accommodation portion 52a, and make the grease in the front grease retention portion 30 easy to come into close contact with the front plunger 57 and the front metal bearing 61. In the case of the embodiment, the wall formed by the rear wall 39 and the front inner wall 13 extends in the up-down direction. The rear wall 39 and the front inner wall 13 correspond to the walls in the present invention.

Figure 5:
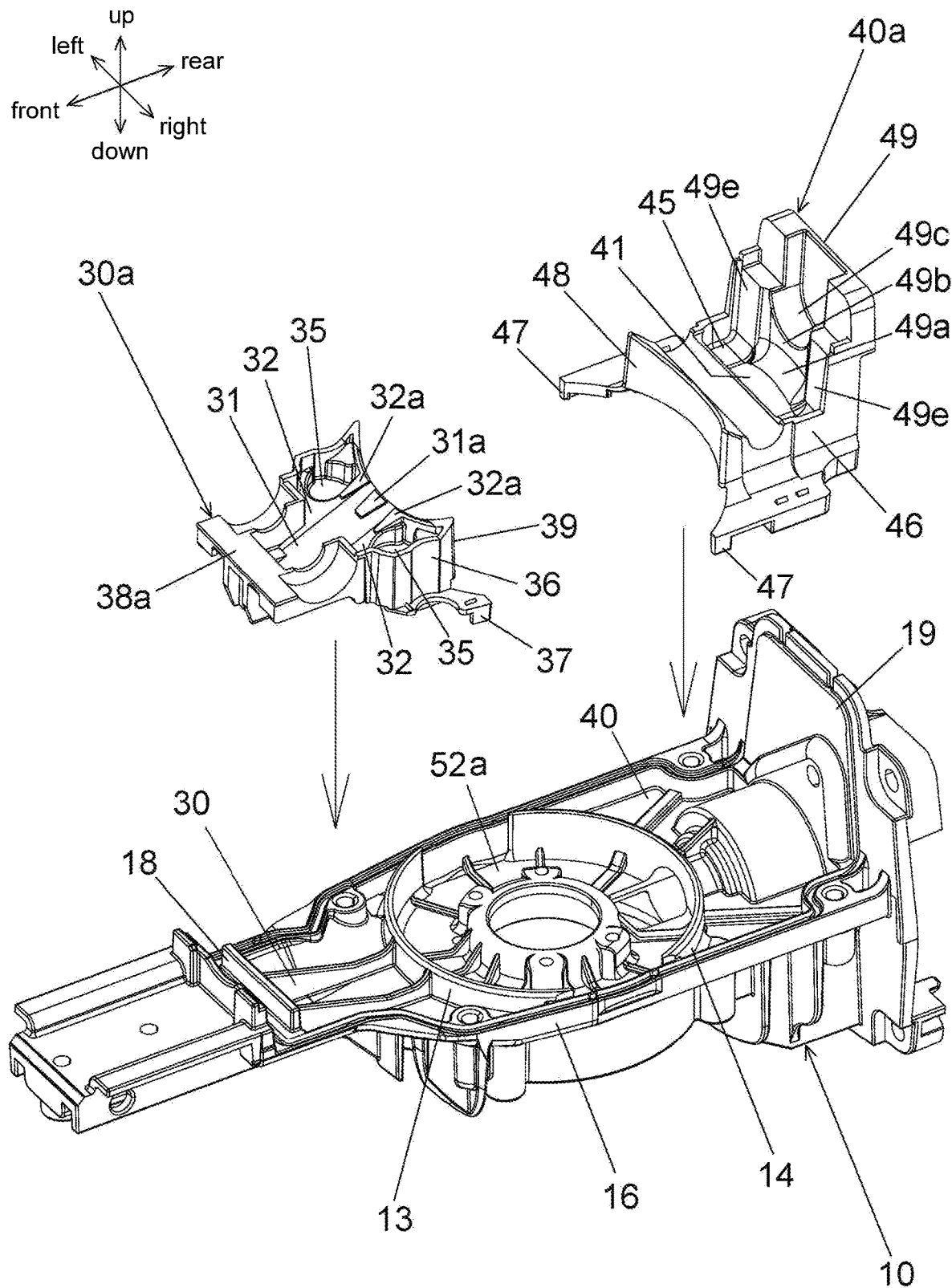
FIG. 5 is a perspective view in a state before the combination of a lower gear cover 10, a front grease receiving member 30a, and a rear grease receiving member 40a in the working machine 1.

As shown in FIGS. 5 and 6, in the rear grease receiving member 40a, a curved surface portion 41 is arranged at the same position as the rear plunger 58 in the left-right direction. The curved surface portion 41 is a curved surface that is convex upward, and is curved so as to become lower from the center in the left-right direction to the left and right. At the rear end of the curved surface portion 41, an inclined portion 49a, a plane portion 49b, and a step portion 49c of a rear wall 49 are connected in sequence. Convex portions 49e protruding forward are arranged on both the left and right sides of the inclined portion 49a, the plane portion 49b, and the step portion 49c. The presence of the convex portions 49e makes the sending path of the grease easy to concentrate on the inclined portion 49a, the plane portion 49b, and the step portion 49c. The curved surface portion 41, the inclined portion 49a, the plane portion 49b, and the step portion 49c constitute a part of the sending mechanism. The inclined portion 49a, the plane portion 49b, and the step portion 49c correspond to the guide portions in the present invention.

Grease reservoir concave portions 45 are respectively arranged on both the left and right sides of the curved surface portion 41. As shown in FIGS. 7 and 8, the grease reservoir concave portion 45 is located at the same position as the rear metal anchor bolt 73 in the front-rear direction and the left-right direction. Along with the vertical oscillation of the plunger holder 68, the head of the rear metal anchor bolt 73 serving as a contact portion moves in and out of the grease reservoir concave portion 45 from above and comes into contact with the grease in the grease reservoir concave portion 45. Thereby, the grease in the grease reservoir concave portion 45 is pushed out onto the curved surface portion 41 and moves upward. In this way, the rear metal anchor bolt 73 constitutes a part of the sending mechanism. The grease on the curved surface portion 41 goes up to the inclined portion 49a, the plane portion 49b, and the step portion 49c due to the vibration during work, the posture change of the main body, or the like. The grease that has moved to the upper end of the plane portion 49b and the upper surface of the step portion 49c comes into close contact with a rear end opening portion of the rear metal bearing 62, thereby entering between the outer circumferential surface of the rear plunger 58 and the inner circumferential surface of the rear metal bearing 62. A part of the grease moves forward from the curved surface portion 41 and moves beyond the upper end of the front wall 38 to the upper surface of the orbital guide 60. Because the rear grease receiving member 40*a* has a container shape that opens upward, the grease that has fallen and moved from the above is reserved in the grease reservoir concave portion 45. In addition, the grease that has fallen and moved from the above is also reserved in the curved surface portion 41 and the inclined portion 49*a* equipped with front and rear walls. That is, the grease reservoir concave portion 45, the curved surface portion 41, and the inclined portion 49*a* each function as the bottom of a container.

As shown in FIG. 6, FIG. 12 through FIG. 14, the front wall 48 becomes higher from the center in the left-right direction to the left and right. Thereby, the lower end of the front wall 48, which can concentrate the grease moving from the upper surface of the orbital guide 60 onto the rear grease receiving member 40*a* due to the vibration during work at the center in the left-right direction, comes into close contact with the upper end of the rear inner wall 14 of the lower gear cover 10. The front wall 48 corresponds to the resin wall in the present invention. In addition, the rear inner wall 14 corresponds to the inner wall in the present invention. The gear accommodation space is partitioned into the gear accommodation portion 52*a* that accommodates the second bevel gear 52 and the rear grease retention portion 40 by a wall that is formed by the front wall 48 and the rear inner wall 14 and extends in the up-down direction. The wall formed by the front wall 48 and the rear inner wall 14 suppresses the movement of grease from the rear grease retention portion 40 to the gear accommodation portion 52*a*, and makes the grease in the rear grease retention portion 40 easy to come into close contact with the rear plunger 58. The front wall 48 and the rear inner wall 14 correspond to the walls in the present invention. Leg portions 47 respectively extending left and right forward from a side wall 46 are arranged in contact with the rear inner wall 14 and the side wall 16 of the lower gear cover 10 to determine a front end position of the rear grease receiving member 40*a* and a position of the rear grease receiving member 40*a* in the left-right direction. A rear end position of the rear grease receiving member 40*a* is determined by the contact between a rear surface of the rear wall 49 and a front surface of a rear wall 19 of the lower gear cover 10. A vertical position of the rear grease receiving member 40*a* is determined by being clamped between the lower gear cover 10 and the upper gear cover 20.

In FIGS. 7 and 8, a virtual line L1 indicates a position in the front-rear direction of the central axis of the oscillation axis shaft 65. A virtual line L2 indicates a position in the front-rear direction of the central axis of the front metal anchor bolt 72. A virtual line L3 indicates a position in the front-rear direction of the rotation center axis of the second bevel gear 52 and the orbital guide 60. A virtual line L4 indicates a position in the front-rear direction of the central axis of the change shaft 66. A virtual line L5 indicates a position in the front-rear direction of the central axis of the rear metal anchor bolt 73. In FIG. 8, a virtual line L6 indicates a position in the front-rear direction of the central axis of the pin 53 at a reciprocating final position of the working machine 1. A virtual line L7 indicates a position in the front-rear direction of a rear end position of the rear plunger 58 at the reciprocating final position of the working machine 1. In FIGS. 7 and 8, hatching indicates a part in which the grease is reserved. This part corresponds to the filling portion.

According to the embodiment, the following effects can be obtained.

(1) By arranging the walls between the grease retention portions (30, 40) and the gear accommodation portion 52*a*, the movement of the grease from the grease retention portions to the gear accommodation portion can be suppressed. Thereby, the grease in the grease retention portion can be easily brought close to the plunger and the metal bearing, and thus the need to overfill with the grease for plunger lubrication is reduced, and the filling amount of the grease can be reduced. In addition, the front grease receiving member 30*a* is arranged under the front plunger 57 and the front metal bearing 61 (on the side in an action direction of gravity) and the grease that has fallen and moved into the front grease receiving member 30*a* can be retained. Thus, the movement of the grease to the gear accommodation portion 52*a* can be further suppressed. Furthermore, the grease that has fallen and moved into the front grease receiving member 30*a* is sent to the side of the front plunger 57 located above (the side in a direction opposite to the action direction of gravity) by the action of the first inclined portion 31 and the second inclined portion 32, and is sent toward the outer circumferential surfaces of the front plunger 57 and the metal bearing 61. Thus, the reduction of the lubrication performance in the transmission mechanism 50 due to the continuation of the work can be suppressed, and the reduction of the lubrication performance between the front plunger 57 and the front metal bearing 61 can be suppressed. In particular, because the first inclined portion 31 and the second inclined portion 32 extend in the direction intersecting the reciprocating direction of the plungers (57, 58), the grease that is subjected to a backward force due to the vibration in the reciprocating direction or the posture change of the main body can be moved upward. In addition, the grease in the grease reservoir concave portion 35 is pushed out to the second inclined portion 32 located above by using the vertical oscillation of the front metal anchor bolt 72 in the orbital mode, and thus the grease can also be sent upward. Therefore, the movement of grease to the space between the front plunger 57 and the front metal bearing 61 can be promoted, and the effect of suppressing the reduction of the lubrication performance is enhanced. In other words, a part of the transmission mechanism 50 that reciprocates up and down (the bolt 72 that moves integrally with the plunger holder 68) can come into contact with the grease retained by the front grease receiving member 30*a*, and thus the grease is smoothly sent to the transmission mechanism 50.

(2) Because the rear grease receiving member 40*a* is arranged under the rear plunger 58 and the rear metal bearing 62, and the grease that has fallen and moved into the rear grease receiving member 40*a* is sent toward the outer circumferential surface of the rear plunger 58, the reduction of the lubrication performance between the rear plunger 58 and the rear metal bearing 62 due to the continuation of the work can be suppressed. In addition, because the grease in the grease reservoir concave portion 45 is pushed out by using the vertical oscillation of the rear metal anchor bolt 73 in the orbital mode, the movement of grease to the space between the rear plunger 58 and the rear metal bearing 62 can be promoted, and the effect of suppressing the reduction of the lubrication performance is enhanced.

(3) Because the rear wall 39 of the front grease receiving member 30*a* and the front inner wall 13 of the lower gear cover 10 are connected to each other, the grease falling from a gap between the rear wall 39 and the outer circumferential surface of the orbital guide 60 can be prevented from moving to a space directly below the front grease receiving member 30a (a space that does not contribute to lubrication), and this grease can be suitably guided to a space between the first bevel gear 51 and the second bevel gear 52. Similarly, because the front wall 48 of the rear grease receiving member 40a and the rear inner wall 14 of the lower gear cover 10 are connected to each other, the grease falling from a gap between the front wall 48 and the outer circumferential surface of the orbital guide 60 can be prevented from moving to a space directly below the rear grease receiving member 40a (a space that does not contribute to lubrication), and this grease can be suitably guided to the space between the first bevel gear 51 and the second bevel gear 52. In addition, the bottoms of the grease retention portions arranged at the front and rear are located between the motor shaft 6a and the output shafts (57, 58) in the up-down direction. In other words, (the bottoms of) the grease retention portions are located at the same position as at least a part of the second bevel gear 52 in the up-down direction. Thereby, the grease may be less likely to reserve in a lower part of the gear accommodation space, the upper surface of the reserved grease may tend to be close to the output shaft, and the amount of grease to be filled can be reduced. In addition, the grease retention portions are arranged at the front and rear of the second bevel gear 52 so as to correspond to the support members that support the output shafts to be capable of sliding forward and backward, and the walls are further arranged so that the grease retention portions are partitioned with respect to the accommodation site of the second bevel gear 52. Thereby, the grease can be configured to reserve in the vicinity of a place where grease supply is required, and the grease that has fallen between the two grease retention portions is moved back and forth by the rotation of the bevel gear, and thus a suitable grease supply cycle can be created.

(4) By using the front grease receiving member 30a and the rear grease receiving member 40a as a resin molded body, complicated shapes can also be easily and inexpensively handled.

Although the present invention has been described above by taking the embodiment as an example, it is understood by those skilled in the art that various modifications can be made on each constituent element and each processing process of the embodiment within the scope of the claims. Hereinafter, a variation example is described.

The working machine 1 may be a cordless type that operates by electric power of a detachably attached battery pack. The motor 6 is not limited to the brushless motor, and may be a brushed motor. The prime mover of the working machine 1 is not limited to the motor 6, and may be another type such as an engine or the like. The working machine of the present invention is not limited to the saber saw, and may be another type that uses a lubricant. In the case of the embodiment, because the working machine often works in a posture in which the output shaft is located in the upper part of the transmission mechanism accommodation portion, a mechanism for sending the lubricant upward is arranged under the output shaft in the case of this posture, but appropriate changes can be made according to a working form of the working machine.

The invention claimed is:

1. A power tool, comprising:
a prime mover;
an output shaft that extends along a first direction and retains a tip tool and is driven by the prime mover;
a support member that supports the output shaft to be drivable;
a gear that rotates around an axis extending in a second direction crossing the first direction and transmits a power of the prime mover to the output shaft; and
a gear cover that accommodates the gear and the support member, wherein
inside the gear cover, a lubricant retention portion capable of retaining a lubricant is arranged at a side of the support member, and
the lubricant retention portion is partitioned from a gear accommodation portion that accommodates a gear by a wall extending in a direction intersecting an extending direction of the output shaft in the gear cover,
wherein the lubricant retention portion has a filling portion having a container shape for the lubricant to be capable of being filled in, and the filling portion and the support member are covered by the gear cover on both sides in the second direction, and
wherein the gear is arranged on one side in the second direction with respect to the output shaft, the filling portion is arranged inside the gear cover on the one side in the second direction with respect to the support member, and a guide surface is arranged which guides the lubricant to move from the filling portion toward the support member by driving the prime mover within the gear cover.

2. The power tool according to claim 1, wherein the gear cover is equipped with a holder that is configured to swing about a swing axis extending in a third direction perpendicular to both of the first direction and the second direction and that is capable of moving the lubricant retained in the filling portion in a direction from the gear toward the output shaft side when the prime mover is driven.

3. The power tool according to claim 2, wherein the filling portion is located between an inner surface of the gear cover and the support member.

4. The power tool according to claim 3, wherein the guide surface is an inclined surface gear
that is inclined with respect to the first direction.

5. The power tool according to claim 2, wherein the support member is fixed to a holder, and the holder is configured to swing about a swing axis extending in a third direction perpendicular to both of the first direction and the second direction gear, and
the holder has a contact portion that is capable of contacting the lubricant retained in the filling portion.

6. The power tool according to claim 5, wherein the contact portion is a fixing member for fixing the support member on the gear.

7. The power tool according to claim 2, wherein the filling portion is a separated member separated from the gear cover, and a bottom of the filling portion is arranged between an inner surface of the gear cover and the support member in the second direction.

8. The power tool according to claim 7, wherein the filling portion has an extending wall facing the gear,
the gear cover has an inner wall connected to the extending wall, and
the wall has the extending wall and the inner wall.

9. The power tool according to claim 1, wherein the guide surface comprises a side wall arranged in the filling portion and extending close to the support member.

10. The power tool according to claim 1, wherein the output shaft extends along the first direction, and the lubricant retention portion is positioned at one side with respect the gear accommodating portion in the first direction.

11. The power tool according to claim 1, wherein the output shaft extends along a front-rear direction,
the output shaft retains the tip tool at a front end thereof, and
the lubricant retention portion is positioned at a rear side with respect to the gear accommodating portion in the front-rear direction.

12. A power tool, comprising:
a prime mover;
an output shaft that retains a tip tool and reciprocates in a first direction by the prime mover;
a support member that supports the output shaft in a reciprocating manner;
a holder to which the support member is fixed;
a gear that transmits a power of the prime mover to the output shaft; and
a gear cover that accommodates the gear and the holder, wherein
at least a part of the holder reciprocates in a second direction perpendicular to the first direction by swinging the holder about a swing axis extending in a third direction perpendicular to both of the first direction and the second direction, and
the gear cover is equipped with
a filling portion in which a lubricant is retained,
wherein the at least a part of the holder which moves along the second direction contacts the lubricant retained in the filling portion when the prime mover is driven.

13. The power tool according to claim 12, further comprising an inclined surface that is inclined with respect to the first direction, and is close to the output shaft, the inclined surface is provided on a side of the support member in the third direction and is connected to the filling portion.

14. The power tool according to claim 12, wherein
the holder has a contact portion that is capable of contacting the lubricant retained in the filling portion and is positioned near the filling portion with respect to the support member.

15. The power tool according to claim 12, wherein the holder is capable of causing the lubricant to move in a direction opposite to a direction of gravity when the second direction is made to match with the direction of gravity.

16. The power tool according to claim 12, wherein the filling portion has a container shape that opens toward the output shaft and has a bottom located between the output shaft and a rotating shaft in second direction.

* * * * *